(12) United States Patent
Ramadhane et al.

(10) Patent No.: US 12,039,843 B2
(45) Date of Patent: Jul. 16, 2024

(54) CARD SKIMMING DETECTION

(71) Applicant: KYNDRYL, INC., New York, NY (US)

(72) Inventors: Mohamed Zouhaier Ramadhane, Azcapotzalco (MX); Cesar Augusto Rodriguez Bravo, Alajuela (CR); Desilda Toska, Alajuela (CR); David Alonso Campos Batista, Aurora (CR)

(73) Assignee: KYNDRYL, INC., New York, NY (US)

( * ) Notice: Subject to any disclaimer, the term of this patent is extended or adjusted under 35 U.S.C. 154(b) by 62 days.

(21) Appl. No.: 17/508,271

(22) Filed: Oct. 22, 2021

(65) Prior Publication Data
US 2023/0132132 A1    Apr. 27, 2023

(51) Int. Cl.
  *G07F 19/00*    (2006.01)
  *G06Q 20/10*    (2012.01)

(52) U.S. Cl.
  CPC ..... *G07F 19/2055* (2013.01); *G06Q 20/1085* (2013.01); *G07F 19/207* (2013.01); *G07F 19/209* (2013.01)

(58) Field of Classification Search
  CPC .... G07F 19/209; G07F 19/2055; G07F 19/20; G07F 19/207; G06Q 20/1085
  See application file for complete search history.

(56) References Cited

U.S. PATENT DOCUMENTS

| | | | |
|---|---|---|---|
| 6,390,367 B1 * | 5/2002 | Doig | G07F 19/20 235/436 |
| 6,422,475 B1 * | 7/2002 | May | G07F 19/2055 235/492 |
| 6,847,393 B2 | 1/2005 | Ashe et al. | |

(Continued)

FOREIGN PATENT DOCUMENTS

| CN | 103295341 | 9/2013 |
|---|---|---|
| GB | 2421300 | 6/2006 |

OTHER PUBLICATIONS

Whittaker, "A new app can detect Bluetooth credit card skimmers on gas pumps", Aug. 14, 2019, 9 pages.

(Continued)

*Primary Examiner* — Daniel I Walsh
(74) *Attorney, Agent, or Firm* — Dan Housley; Andrew D. Wright; Calderon Safran & Wright P.C.

(57) ABSTRACT

A method includes: monitoring outputs of sensors in a machine that receives magnetic stripe cards; determining the outputs of sensors indicate normal usage of the machine or abnormal usage of the machine; in response to determining the outputs of the sensors indicate abnormal usage of the machine, initiating a security action; in response to determining the outputs of the sensors indicate normal usage of the machine, determining the machine is in use or not in use; in response to determining the machine is not in use, initiating the security action; in response to determining the machine is in use, determining whether the use ends within a predefined monitor time; in response to determining the (Continued)

use does not end within the predefined monitor time, initiating the security action; and in response to determining the use does end within the predefined monitor time, returning to monitoring the outputs of the sensors.

14 Claims, 4 Drawing Sheets

(56) References Cited

U.S. PATENT DOCUMENTS

| | | | | |
|---|---|---|---|---|
| 8,395,500 | B1* | 3/2013 | Dent | G08B 13/1609 348/150 |
| 8,496,168 | B1* | 7/2013 | Miller | G06Q 20/3221 235/379 |
| 8,523,072 | B2* | 9/2013 | Randolph | G06K 7/01 235/380 |
| 8,695,879 | B1* | 4/2014 | Whytock | G06K 13/0881 235/382 |
| 8,746,552 | B1* | 6/2014 | Yokomoto | G07F 19/207 235/375 |
| 9,666,035 | B2* | 5/2017 | Blower | G07D 11/225 |
| 9,767,422 | B2* | 9/2017 | Ray | G07F 19/2055 |
| 9,922,506 | B2* | 3/2018 | Hodges | G07F 19/2055 |
| 10,572,698 | B1* | 2/2020 | Keener | G06K 7/0095 |
| 11,222,514 | B1* | 1/2022 | Young | G06Q 20/18 |
| 11,436,898 | B1* | 9/2022 | Oliveira | G07F 19/207 |
| 11,657,681 | B1* | 5/2023 | Rodriguez Bravo | G07F 19/207 235/379 |
| 11,875,652 | B2* | 1/2024 | Rodriguez Bravo | G07F 19/209 |
| 2005/0151645 | A1* | 7/2005 | Meskens | G08B 13/187 340/552 |
| 2006/0169764 | A1* | 8/2006 | Ross | G07F 19/20 235/375 |
| 2007/0057070 | A1* | 3/2007 | Scarafile | G06K 7/084 235/475 |
| 2008/0191860 | A1* | 8/2008 | Flook | G07F 19/20 340/506 |
| 2009/0201372 | A1* | 8/2009 | O'Doherty | G07F 19/20 348/150 |
| 2012/0038772 | A1* | 2/2012 | Priesterjahn | G07F 19/20 348/150 |
| 2012/0038773 | A1* | 2/2012 | Priesterjahn | G07F 19/207 348/150 |
| 2012/0080518 | A1* | 4/2012 | Van Den Bogart | G06K 13/0843 235/475 |
| 2013/0146662 | A1* | 6/2013 | Randolph | G06K 7/01 235/439 |
| 2013/0229333 | A1* | 9/2013 | Schwartz | G06F 1/3246 345/156 |
| 2013/0320171 | A1* | 12/2013 | Mccafferty | G07G 1/01 248/291.1 |
| 2014/0158768 | A1* | 6/2014 | Ray | H04K 3/825 235/449 |
| 2014/0232863 | A1* | 8/2014 | Paliga | H04N 21/4431 348/143 |
| 2014/0372305 | A1* | 12/2014 | Ray | G06Q 10/06 705/44 |
| 2015/0091547 | A1* | 4/2015 | Vasilev | G07F 19/207 324/76.45 |
| 2015/0134107 | A1* | 5/2015 | Hyde | G16H 20/13 700/237 |
| 2015/0213427 | A1* | 7/2015 | Hodges | G07F 19/2055 705/18 |
| 2015/0213428 | A1* | 7/2015 | Hodges | H04K 3/822 705/18 |
| 2015/0242707 | A1* | 8/2015 | Wilf | G06F 18/2413 382/159 |
| 2016/0140523 | A1* | 5/2016 | Johnson | G07F 19/201 705/43 |
| 2017/0004466 | A1* | 1/2017 | Robles Gil Daellenbach | G07F 19/2055 |
| 2017/0061167 | A1* | 3/2017 | McNicoll | G06K 13/0875 |
| 2017/0185811 | A1* | 6/2017 | Hoson | G06K 7/0008 |
| 2017/0262664 | A1* | 9/2017 | Leiponis | G06K 7/10316 |
| 2017/0372144 | A1* | 12/2017 | Kurita | G08B 13/196 |
| 2019/0096197 | A1* | 3/2019 | Hodges | H04K 3/822 |
| 2019/0122492 | A1* | 4/2019 | Nguyen | G07F 17/3239 |
| 2020/0118397 | A1* | 4/2020 | Yang | G07F 19/207 |
| 2020/0134985 | A1* | 4/2020 | Fujimoto | G07F 19/2055 |
| 2020/0302755 | A1* | 9/2020 | Edwards | G06V 10/225 |
| 2020/0387679 | A1* | 12/2020 | Miyazawa | G06K 13/0868 |
| 2021/0374765 | A1* | 12/2021 | Mitchell | G07F 19/2055 |
| 2022/0108591 | A1* | 4/2022 | Jayabalan | G07F 19/207 |
| 2022/0180712 | A1* | 6/2022 | Belshaw | G07F 7/088 |
| 2023/0004971 | A1* | 1/2023 | Rodriguez Bravo | H04L 63/1491 |
| 2023/0054605 | A1* | 2/2023 | Chen | G07F 19/2055 |
| 2023/0129964 | A1* | 4/2023 | Rodriguez Bravo | G07F 19/207 705/43 |
| 2023/0137390 | A1* | 5/2023 | Cammas | G06K 19/07705 713/186 |
| 2023/0252803 | A1* | 8/2023 | Burris | G07G 3/00 348/150 |

OTHER PUBLICATIONS

Anonymous, "Anti Skimming Devices: The Complete Guide", Sep. 28, 2020, 13 pages.
Shawn, "All about Proximity Sensors: Which type to use?", https://www.seeedstudio.com/blog/2019/12/19/all-about-proximity-sensors-which-type-to-use/, Dec. 19, 2019, 15 pages.
Gudino, "How Do Motion Sensors Work? Types of Motion Sensors", https://www.arrow.com/en/research-and-events/articles/how-motion-sensors-work, accessed Oct. 14, 2021, 4 pages.
Lin, "Pattern Recognition in Time Series", 2011, 28 pages.
Anonymous, "Everything You Must Know About ATM Skimming", https://www.technology.org/2019/10/11/everything-you-must-know-about-atm-skimming/, Oct. 11, 2019, 10 pages.
Anonymous, "Anti-Skim Protection DIP and Motorized Card Readers", https://www.cumminsallison.com/us/en/products/atm/anti-skim, accessed Oct. 21, 2021, 3 pages.

* cited by examiner

CARD SKIMMING DETECTION

BACKGROUND

Aspects of the present invention relate generally to electronic device security and, more particularly, to card skimming detection using plural different sensors.

An automated teller machine (ATM) is a financial automation device by which account holders may access their account to perform transactions, such as deposit, withdraw, and transfer funds. Account holders typically insert their card into an ATM by inserting a magnetics stripe card (e.g., a credit card or an ATM card) into the ATM.

SUMMARY

In a first aspect of the invention, there is a computer-implemented method including: monitoring, by a computing device, outputs of sensors associated with a machine that receives magnetic stripe cards; in response to the monitoring, detecting, by the computing device, the output of at least one of the sensors indicates an event; in response to the detecting the output of at least one of the sensors indicates an event, determining, by the computing device, the outputs of the sensors indicate normal usage of the machine or abnormal usage of the machine; in response to determining the outputs of the sensors indicate abnormal usage of the machine, initiating, by the computing device, a security action; in response to determining the outputs of the sensors indicate normal usage of the machine, determining, by the computing device, the machine is in use or not in use; in response to determining the machine is not in use, initiating, by the computing device, the security action; in response to determining the machine is in use, determining, by the computing device, whether the use ends within a predefined monitor time; in response to determining the use does not end within the predefined monitor time, initiating, by the computing device, the security action; and in response to determining the use does end within the predefined monitor time, returning to the monitoring the outputs of the sensors.

In another aspect of the invention, there is a computer program product including one or more computer readable storage media having program instructions collectively stored on the one or more computer readable storage media. The program instructions are executable to: monitor outputs of sensors in a machine that receives magnetic stripe cards; determine the outputs of sensors indicate normal usage of the machine or abnormal usage of the machine; in response to determining the outputs of the sensors indicate abnormal usage of the machine, initiate a security action; in response to determining the outputs of the sensors indicate normal usage of the machine, determine the machine is in use or not in use; in response to determining the machine is not in use, initiate the security action; in response to determining the machine is in use, determine whether the use ends within a predefined monitor time; in response to determining the use does not end within the predefined monitor time, initiate the security action; and in response to determining the use does end within the predefined monitor time, return to monitoring the outputs of the sensors.

In another aspect of the invention, there is system including a processor, a computer readable memory, one or more computer readable storage media, and program instructions collectively stored on the one or more computer readable storage media. The program instructions are executable to: monitor outputs of sensors in a machine that receives magnetic stripe cards; determine the outputs of sensors indicate normal usage of the machine or abnormal usage of the machine; in response to determining the outputs of the sensors indicate abnormal usage of the machine, initiate a security action; in response to determining the outputs of the sensors indicate normal usage of the machine, determine the machine is in use or not in use; in response to determining the machine is not in use, initiate the security action; in response to determining the machine is in use, determine whether the use ends within a predefined monitor time; in response to determining the use does not end within the predefined monitor time, initiate the security action; and in response to determining the use does end within the predefined monitor time, return to monitoring the outputs of the sensors.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
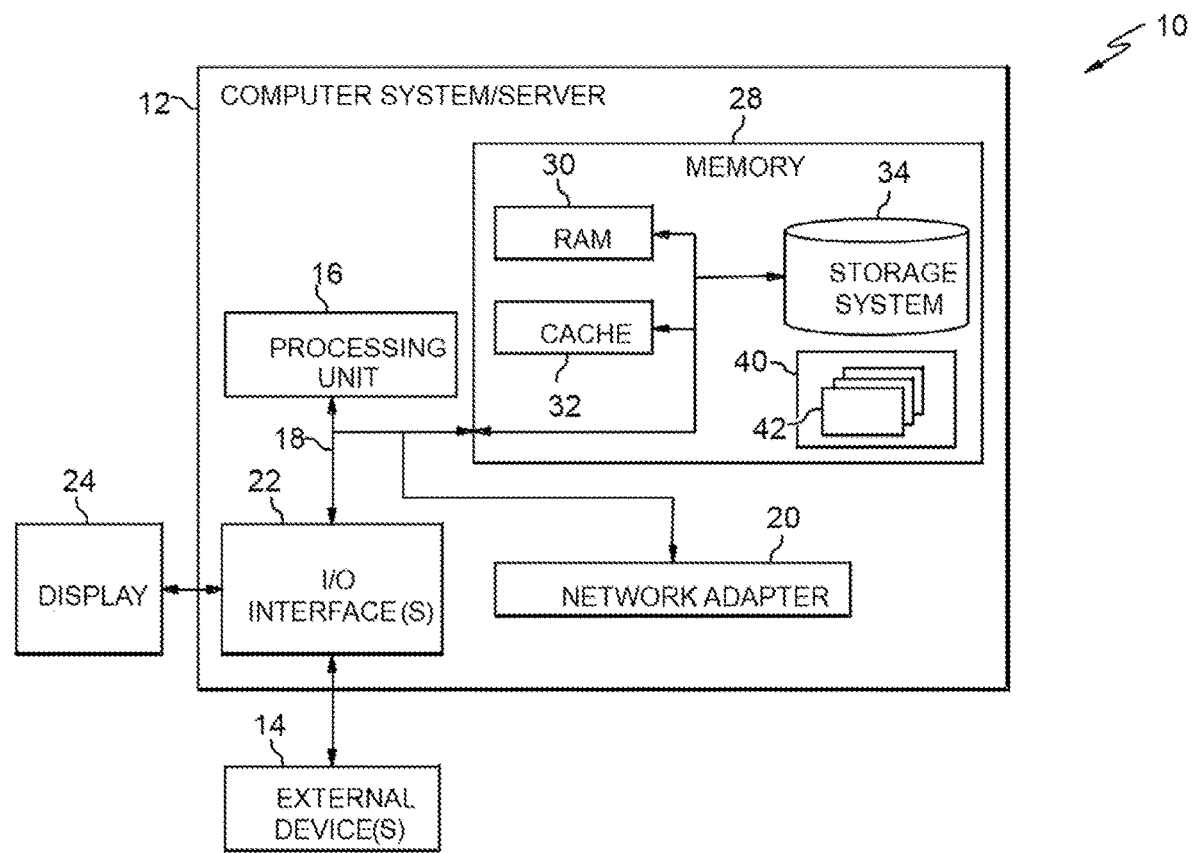
FIG. 1 depicts a computer infrastructure according to an embodiment of the present invention.

Aspects of the present invention relate generally to electronic device security and, more particularly, to card skimming detection using plural different sensors. Credit card skimming is a type of credit card theft where a small device is used to capture credit card information in an otherwise legitimate credit or debit card transaction. When a credit or debit card is swiped through a skimmer, the device captures and stores all the details stored in the card's magnetic stripe. The stripe contains the credit card number, expiration date, and the credit card holder's full name. Data obtained in this manner may be used to make fraudulent charges either online or with a counterfeit credit card. Credit card skimmers are often placed over the card swipe mechanism on ATMs, but the skimmers can be placed over almost any type of credit card reader. With ATMs, a small camera may be pointed at the skimmer to record a user's personal identification number (PIN), which provides all the information needed to make fake cards and withdraw cash from the cardholder's account. Therefore, card skimmers represent a security threat to electronic accounts.

Conventional anti-skimming systems suffer from a high number of false positive alarms. For example, when a single type of sensor is used in an anti-skimming system, the system can mistakenly interpret the sensor output as indicating an abnormal situation even when a legitimate use of the machine is occurring. Aspects of the invention address this problem of current systems by utilizing plural different types of sensors embedded or integrated in a machine that receives magnetic stripe cards (such as an ATM), the system being configured to detect a significant change of value of a measured state and, in response to the detecting, to determine whether the outputs of the plural sensors indicate a normal usage or an abnormal usage of the machine. In embodiments, the system generates an alert when the plural different outputs from the plural different types of sensors match a pattern of abnormal use. In this manner, implementations of the invention provide an anti-skimming system that reduces false positive alarms.

Implementations of the invention thus provide an improvement in the technology of machines that receive magnetic stripe cards (such as ATMs) by providing a technical solution to the technical problem of security threats posed by card skimming devices. In embodiments, the technical solution includes utilizing plural different types of sensors to detect a significant change of value of a measured state at a machine and, in response to the detecting, determining whether the outputs of the plural sensors indicate a normal usage or an abnormal usage of the machine. In embodiments, the determination of whether the outputs of the plural sensors indicate a normal or abnormal usage is made using an analytics model that is trained using machine learning algorithms and data from the specific types of sensors embedded or integrated in the machine.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
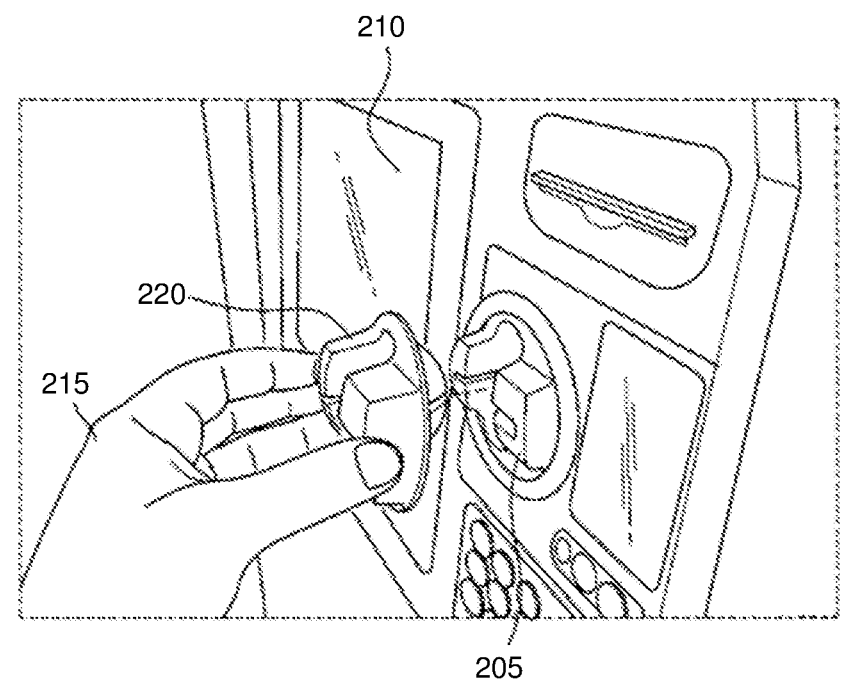
FIG. 2 illustrates an example of a card insertion portion of a machine that receives magnetic stripe cards in accordance with aspects of the invention.

FIG. 2 illustrates an example of a card insertion portion 205 of a machine 210 that receives magnetic stripe cards, such as an automated teller machine (ATM). An ATM is a financial automation device by which account holders may access their account to perform transactions, such as deposit, withdraw, and transfer funds. In FIG. 2, a user's hand 215 holds a card skimming device 220 in the act of placing the card skimming device 220 on the card insertion portion 205 of the machine 210. The card skimming device 220 is an unauthorized attachment. As illustrated in FIG. 2, the card skimming device 220 has a shape that is very similar to the shape of a card insertion portion (bezel) 205 provided in a main body of the machine 210, and has a structure to be mounted over the card insertion portion 205. The card skimming device 220 is placed on and covering the card insertion portion 205 in an effort to trick unsuspecting users into inserting their magnetic stripe card (e.g., credit card or ATM card) into the card skimming device 220. The card skimming device 220 includes electronics that read and store information from the magnetic stripe of a card inserted into the device. Information obtained in this manner can be used to gain unauthorized access to the financial account of the owner of the card. Therefore, card skimming devices represent a security threat to electronic accounts.

Card skimming devices may have different shapes and sizes depending on the different machines they target. In contrast to the relatively small size of the card skimming device 220 compared to the machine 210 shown in FIG. 2, other cards skimming devices cover most or all of the front face of the machine. Some card skimming devices are sized and shaped to overlay magnetic stripe card point-of-sale (POS) terminals at grocery and convenience stores. Others are sized and shaped to overlay magnetic stripe card receiving portions of automated gasoline terminal and other kiosks. However, in nearly all situations, the card skimming device covers a portion of the machine. Aspects of the invention are usable to address the threat posed by card skimming devices that cover a portion of a machine while also minimizing or eliminating false positive alarms suffered by conventional systems.

Figure 3:
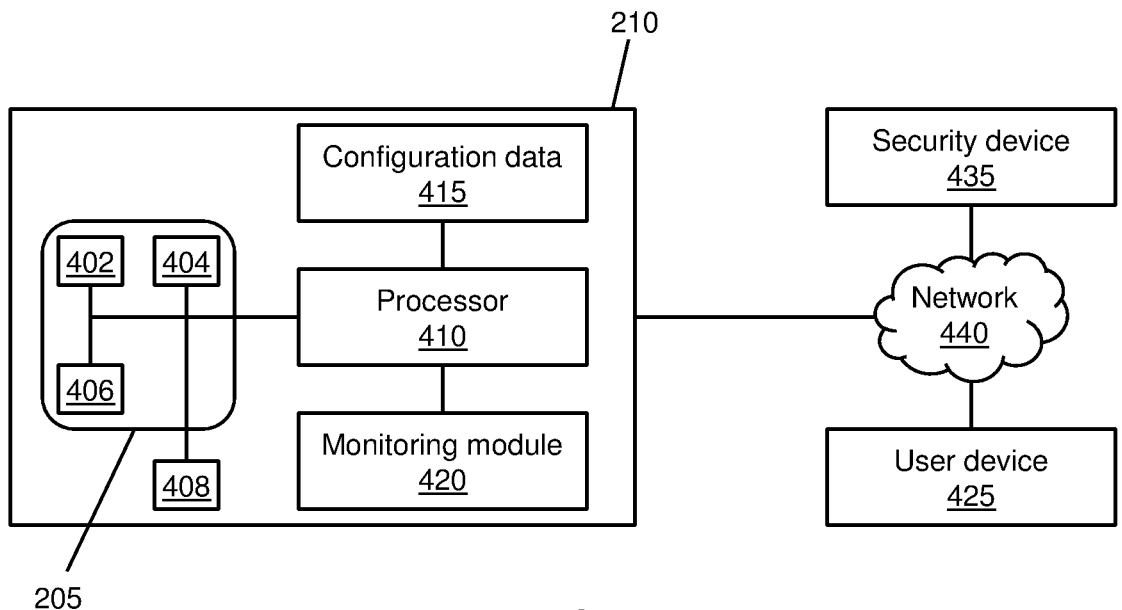
FIG. 3 shows a block diagram of an exemplary system in accordance with aspects of the invention.

FIG. 3 shows a block diagram of an exemplary system in accordance with aspects of the invention. As shown in FIG. 3, the system includes a machine 210 that includes a card insertion portion 205 where a user inserts a magnetic stripe card (e.g., a credit card or an ATM card) to initiate a transaction with the machine 210. In accordance with aspects of the invention, the machine 210 includes plural different sensors that are used to determine when a credit card skimming device is attached to the machine 210. In embodiments, the sensors include a first proximity sensor 402, a second proximity sensor 404, a light detection sensor 406, and a motion detection sensor 408.

The machine 210 may be an ATM or another type of machine that receives magnetic stripe cards. For example, the machine 210 may be an automated gasoline terminal that includes a card insertion portion 205 where a user inserts a magnetic stripe card to initiate a transaction.

In embodiments, the machine 210 includes a processor 410, configuration data 415, and a monitoring module 420. The processor 410 is a processing unit such as processor 16 of FIG. 1. The configuration data 415 is stored in memory such as storage system 34 of FIG. 1. The monitoring module 420 may comprise one or more program modules 42 of FIG. 1. The sensors 402, 404, 406, 408 may be connected to the processor 410 by an interconnect such as bus 18 of FIG. 1.

Figure 5:
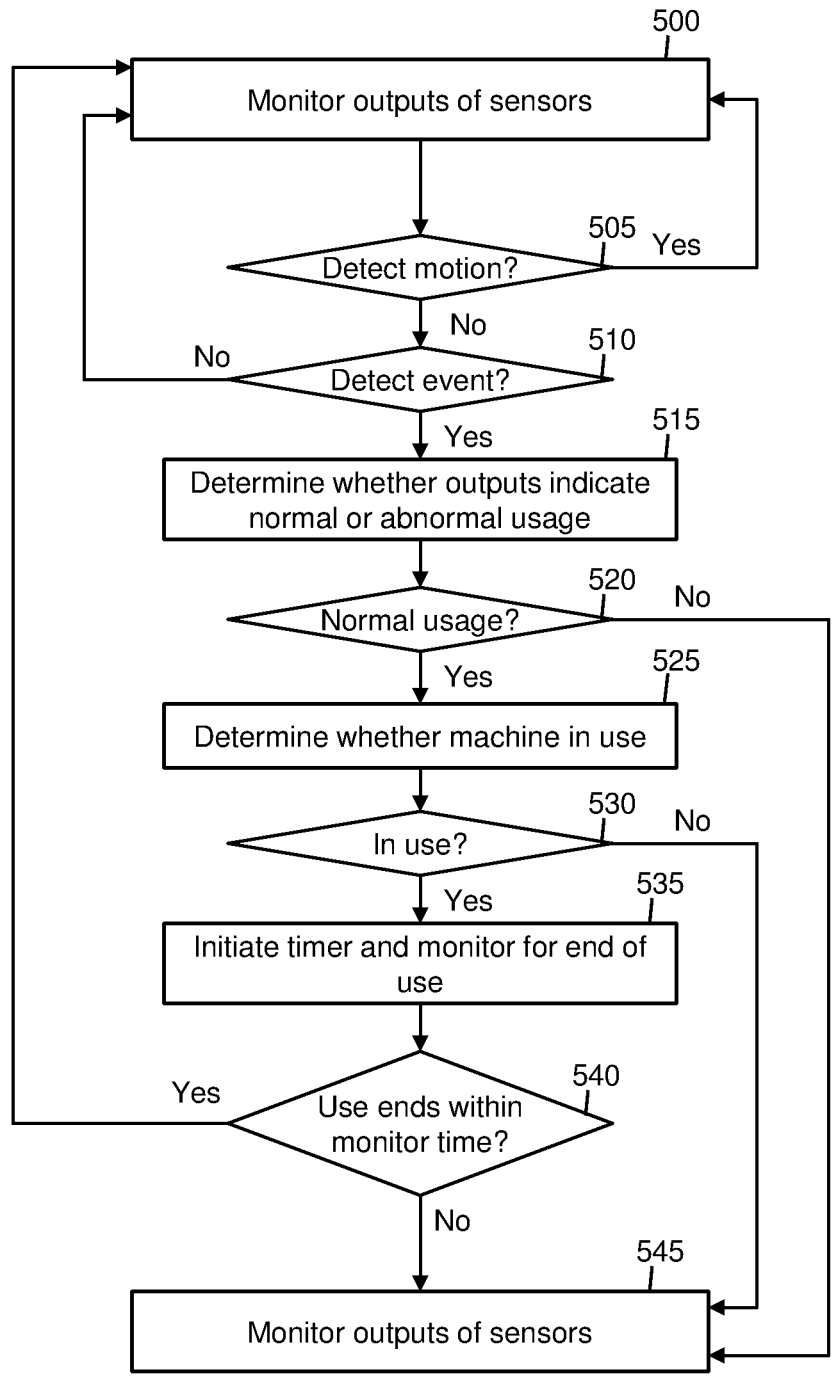
FIG. 5 shows a flowchart of an exemplary method in accordance with aspects of the invention.

In this manner, the processor 410 may receive the respective outputs of the individual sensors 402, 404, 406, 408 and execute the monitoring module 420 using the outputs to perform one or more functions described herein, such as the functions described with respect to FIGS. 5 and 6.

Although not shown in FIG. 3, the machine 210 may include a processor, memory, and operating system that operate to perform the primary functions of the machine, such as account access functions at an ATM, credit card transaction functions at a POS terminal, etc. The processor 410 may be the same processor that runs the operating system of the machine 210 or may be a separate processor that is dedicated for the anti-skimming functions described herein. The configuration data 415 may be stored in a shared memory of the machine 210 or may be stored in a separate memory that is dedicated for the anti-skimming functions described herein.

In embodiments, the machine 210 is connected to a network 440 through which the machine 210 can communicate with other devices such as a user device 425 and an external security device 435. In this manner, in response to determining a security action based on the output of one or more of the sensors 402, 404, 406, 408 the machine 210 may initiate the security action using communications over the network 440.

With continued reference to FIG. 3, in implementations the first proximity sensor 402 and the second proximity sensor 404 are sensors that use different technologies to detect the proximity of an object relative to the sensor. In embodiments, the first proximity sensor 402 is an infrared (IR) proximity sensor and the second proximity sensor 404 is an ultrasonic proximity sensor. Other types of proximity sensors may also be used, such as capacitive proximity sensors, inductive proximity sensors, etc. Using different sensing technologies for the sensors 402, 404 improves the accuracy of the system (and therefore reduces the likelihood of generating a false positive alarm) by providing an additional verification mechanism for the state indicated by the output of one of the sensors.

In accordance with aspects of the invention, the first proximity sensor 402 and the second proximity sensor 404 are embedded in (or integrated with) the card insertion portion 205 of the machine 210 and point outward from the card insertion portion 205 toward an area that is immediately in front of the card insertion portion 205. This area is typically unoccupied unless someone is using the machine 210, or unless a card skimming device has been placed on the machine 210. In embodiments, each of the first proximity sensor 402 and the second proximity sensor 404 is configured to have a sensor detection distance (e.g., range) from 0.1 cm to 10 cm. In accordance with aspects of the invention, the monitoring module 420 uses the output of the first proximity sensor 402 and the second proximity sensor 404 to determine whether there are any objects in front of the card insertion portion 205, and how close the object is to the card insertion portion 205.

With continued reference to FIG. 3, in implementations the light detection sensor 406 is embedded in (or integrated with) the machine 210 and points outward from the machine 210 toward an area that is in front of the machine 210. In embodiments, the light detection sensor 406 is a photoresistor, which is a passive component whose output changes value based on the amount of light (luminosity) that is incident on the sensor. Other types of light detection sensor may also be used. In accordance with aspects of the invention, the monitoring module 420 uses the output of the light detection sensor 406 to determine an amount of light that is incident on a particular location of the machine 210. In one example, the light detection sensor 406 is embedded in (or integrated with) the card insertion portion 205 of the machine 210. In another example, the light detection sensor 406 is embedded in (or integrated with) a portion of the machine 210 other than the card insertion portion 205, and can be used to detect an overlay that covers a large part of the machine 210 in addition to the card insertion portion 205.

With continued reference to FIG. 3, in implementations the motion detection sensor 408 is embedded in (or integrated with) the machine 210 and points outward from the machine 210 toward an area that is in front of the machine 210. In embodiments, the motion detection sensor 408 is a passive infrared (PIR) sensor, a microwave sensor, or a dual-tech PIR and microwave sensor. In accordance with aspects of the invention, the monitoring module 420 uses the output of the motion detection sensor 408 to detect when an object moves near the front of the machine 210. In embodiments, in response to the output of the motion detection sensor 408 indicating movement of an object, the system temporarily pauses monitoring the output of the other sensors 402, 404, 406. This technique may be used to reduce the number of false positive alarms since detected movement is indicative of someone using the machine 210 for a legitimate purpose. In further embodiments, if the amount of detected movement is above a predetermined threshold value, then the system initiates a security action for further investigation.

Still referring to FIG. 3, in implementations the monitoring module 420 continuously monitors the respective outputs of the sensors 402, 404, 406 for the occurrence of an event. In embodiments, an event is a significant change of value of a measured state as defined by respective thresholds for each type of sensor. In embodiments, in response to detecting an event, the monitoring module 420 determines whether the outputs of the sensors 402, 404, 406 indicate a normal usage or an abnormal usage of the machine 210. In embodiments, if the outputs of the sensors 402, 404, 406 indicate an abnormal usage of the machine 210, then the monitoring module 420 initiates a security action. In embodiments, if the outputs of the sensors 402, 404, 406 indicate a normal usage of the machine 210, then the monitoring module 420 determines whether the machine 210 is currently in use. In embodiments, if the monitoring module 420 determines at this step that the machine 210 is not in use, then the monitoring module 420 initiates a security action. In embodiments, if the monitoring module 420 determines at this step that the machine 210 is in use, then the monitoring module 420 starts a timer and monitors the machine 210 to determine when the use ends. In embodiments, if the monitoring module 420 determines at this step that the use ends within a predefined amount of time, then the process returns to the monitoring state and no security action is initiated for this event. In embodiments, if the monitoring module 420 determines at this step that the use does not end within a predefined amount of time, then the monitoring module 420 initiates a security action.

In embodiments, the security action includes one or more of: sending an alert message to a user device 425; causing the machine 210 to emit an alert that is audio and/or visual; activating an external security device 435, e.g., camera that is external to and pointed at the machine 210; and disabling the machine 210.

According to an aspect of the invention, the monitoring module 420 determines whether the outputs of the sensors 402, 404, 406 indicate a normal usage or an abnormal usage of the machine 210 using a trained analytics model. In embodiments, the monitoring module 420 uses an analytics model that is trained using machine learning algorithms and training data sets. In embodiments, each of the training data sets comprising historic sensor data, e.g., data from a first proximity sensor of the same type as sensor 402, data from a second proximity sensor of the same type as sensor 404, and data from a light detection sensor of the same type as sensor 406. In embodiments, each of the training data sets has a time associated with it, so that plural successive data sets constitute training sets of time series data. In embodiments, each of the training sets of time series data is labeled as positive (e.g., normal usage) or negative (i.e., abnormal usage). In embodiments, the analytics model is trained using machine learning algorithms and these labeled training sets of time series data to recognize patterns in the time series data that correspond to one of the two labels. Training in this manner creates a model that receives time series data from the sensors 402, 404, 406 as an input and that, based on the input, outputs a determination of normal usage of the machine 210 or an abnormal usage of the machine 210. In this manner, the monitoring module 420 may use the model with real time data from the sensors 402, 404, 406 to determine whether the machine 210 is undergoing a normal usage or an abnormal usage.

According to another aspect of the invention, the monitoring module 420 determines whether the outputs of the sensors 402, 404, 406 indicate a normal usage or an abnormal usage of the machine 210 using predefined threshold values for each sensor. In embodiments, a respective threshold value is defined for each of the sensors 402, 404, 406. In embodiments, when the respective outputs of all the sensors 402, 404, 406 exceed their threshold value simultaneously and continuously for a predefined amount of time referred to as a threshold time, then the monitoring module 420 deems this as an abnormal usage of the machine 210. On the other hand, if the respective output of any one or more of the sensors does not exceed its threshold value continuously during the predefined amount of time, then the monitoring module 420 deems this as not an abnormal usage of the machine 210 and resets to the monitoring state. In embodiments, the respective threshold values for each sensor and the predefined threshold time are configurable values that are stored in the configuration data 415. In embodiments, the respective threshold values are the same threshold values that are used to detect an event, e.g., a significant change of value of a measured state as defined by respective thresholds for each type of sensor.

In embodiments, the threshold time is set to a value that exceeds the expected time for a user to conduct a normal transaction with the machine 210. For example, the threshold time may be set at fifteen minutes, twenty minutes, etc. This is because during a legitimate use of the machine 210, a user might place a bag or other object near the machine 210 in a manner that causes the outputs of all the sensors 402, 404, 406 exceed their threshold value simultaneously. During a legitimate use of the machine, it is expected that the user will conclude their transaction within an expected amount of time (e.g., normally less than five minutes) and, when they leave, remove any object that causes the sensor outputs to exceed their threshold values. On the other hand, when a card skimming device is placed on the machine 210, such devices are typically left in place for day, weeks, or even months at a time. As such, in embodiments, the threshold time is set to a value that exceeds the expected time for a user to conduct a normal transaction but is less than the amount of time that a card skimming device is expected to remain on the machine.

Figure 4:
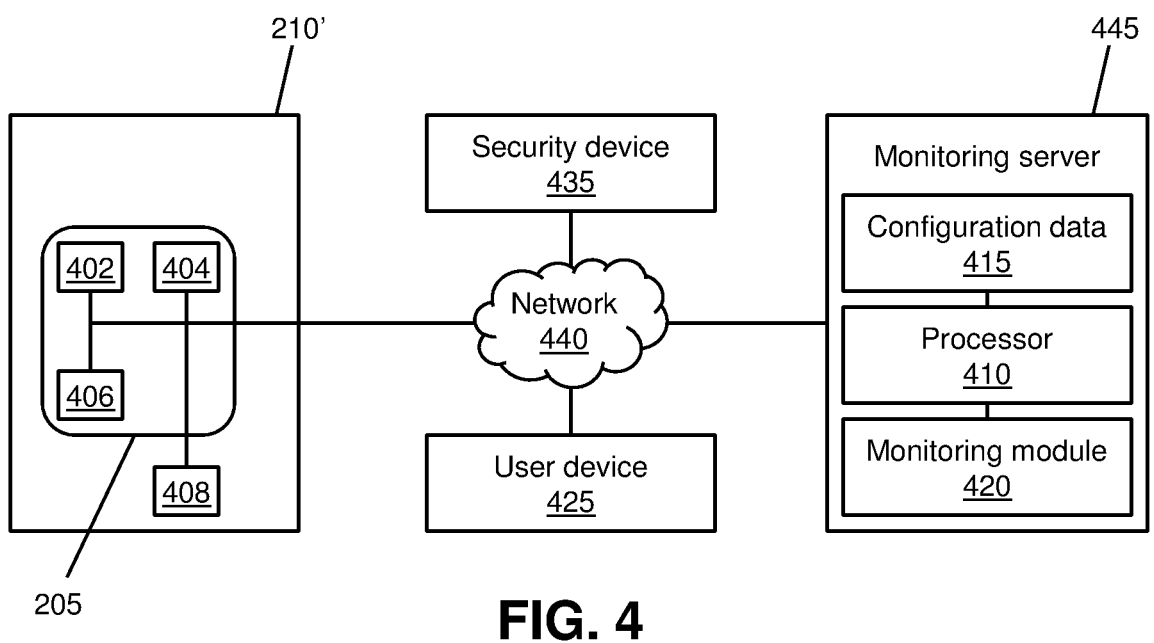
FIG. 4 shows a block diagram of another exemplary system in accordance with aspects of the invention.

FIG. 4 shows a block diagram of another exemplary system in accordance with aspects of the invention. The system shown in FIG. 4 includes elements similar to those shown in the system in FIG. 3. However, in the system in FIG. 3 the processor 410, configuration data 415, and monitoring module 420 are included in the machine 210, whereas in the system in FIG. 4 the processor 410, configuration data 415, and monitoring module 420 are included in a monitoring server 445 that is remote from the machine 210' and is connected to the machine 210' via the network 440. The monitoring server 445 is a computing device and may include one or more elements of the computer system 12 of FIG. 1.

In the system shown in FIG. 3, the machine 210 may include additional or fewer modules than those shown. Similarly, in the system shown in FIG. 4, the monitoring server 445 may include additional or fewer modules than those shown. In both systems, the functions performed by separate modules may be integrated into a single module. Additionally, or alternatively, the functions performed a single module may be implemented as multiple modules. Moreover, the quantity of devices and/or networks in the environment is not limited to what is shown in FIGS. 3 and 4. In practice, the environment may include additional devices and/or networks; fewer devices and/or networks; different devices and/or networks; or differently arranged devices and/or networks than illustrated in FIGS. 3 and 4.

FIG. 5 shows a flowchart of an exemplary method in accordance with aspects of the present invention. Steps of the method may be carried out in the environments of FIGS. 3 and 4 and are described with reference to elements depicted in FIGS. 3 and 4.

At step 500, the system (e.g., the monitoring module 420) continuously monitors the respective outputs of the sensors 402, 404, 406, 408.

At step 505, if the monitoring module 420 detects motion in front of the machine 210 using the output of the motion sensor 408, then the monitoring module 420 waits a predefined amount of time referred to as a buffer time and then returns to step 500. In embodiments, and as described with respect to FIG. 3, detecting motion is often indicative of a legitimate use of the machine 210. As a result, in embodiments, the system temporarily suspends the monitoring in response to detecting motion. On the one hand, if the motion was a person performing a legitimate use with the machine 210, then the act of temporarily suspends the monitoring reduces the chance that a false positive will be triggered base don this use. On the other hand, if the motion was a person placing a card skimming device on the machine 210, then the system will detect the card skimming device on a subsequent iteration of the monitoring, such that the temporary suspending of monitoring does not cause the system to miss this detection.

At step 510, if no motion was detected, the monitoring module 420 determines whether an event occurred using the outputs of one or more of the sensors 402, 404, 406. In embodiments, and as described with respect to FIG. 3, an event is a significant change of value of a measured state as defined by respective thresholds for each type of sensor. At step 510, if the system does not detect an event, then the process returns to step 500 and the system continues to monitor the outputs of the sensors.

At step 510, if the system does detect an event, then at step 515 the monitoring module 420 determines whether the outputs of the sensors 402, 404, 406 indicate a normal usage or an abnormal usage of the machine 210. In embodiments, and as described with respect to FIG. 3, determines whether the outputs of the sensors 402, 404, 406 indicate a normal usage or an abnormal usage of the machine 210 using either a trained model or predefined threshold values for each sensor.

At step 520, if the outputs of the sensors 402, 404, 406 indicate an abnormal usage of the machine 210, then the monitoring module 420 initiates a security action at step 545. In embodiments, and as described with respect to FIG. 3, the security action includes one or more of: sending an alert message to a user device 425; causing the machine 210 to emit an alert that is audio and/or visual; activating an external security device 435, e.g., camera that is external to and pointed at the machine 210; and disabling the machine 210.

At step 520, if the outputs of the sensors 402, 404, 406 indicate a normal usage of the machine 210, then at step 525 the monitoring module 420 determines whether the machine 210 is currently in use. In embodiments, and as described with respect to FIG. 3, the monitoring module 420 determines whether the machine 210 is currently in use by communicating with the operating system of the machine 210. In embodiments, in use means that a person is using the machine to perform a transaction. For example, when the machine 210 is an ATM, the machine 210 is in use when a person is inserting a card into the machine 210 and/or providing input to the machine 210 via keypad or touchscreen. In embodiments, the operating system of the machine 210 maintains a current status of the machine (e.g., in use or not in use), and at step 525 the monitoring module 420 polls the operating system of the machine 210 to determine this current status.

At step 530, if the monitoring module 420 determines that the machine 210 is not in use, then the monitoring module 420 initiates a security action at step 545.

At step 530, if the monitoring module 420 determines that the machine 210 is in use, then at step 535 the monitoring module 420 starts a timer and monitors the machine 210 to determine when the use ends. In embodiments, the monitoring module 420 periodically communicates with the operating system of the machine 210 to determine whether the machine is still in use or whether the use has ended. In embodiments, the monitoring module 420 performs this communication with the operating system of the machine 210 for a predefined amount of time referred to as a monitor time, which may be a configurable value that is stored in the configuration data 415.

At step 540, if the monitoring module 420 determines that the use ends within the monitor time, then the process returns to the monitoring state at step 500 and no security action is initiated for this event. On the other hand, if the monitoring module 420 determines at step 540 that the use does not end within the monitor time, then the monitoring module 420 initiates a security action at step 545.

In view of the forgoing description, it should be understood that aspects of the invention provide for a computer-implemented process for detecting an unauthorized change to a device, the computer-implemented process comprising: in response to monitoring the device using a plurality of sensors including photoresistor, sonic and proximity sensors located in predetermined positions on and within the device, recording information including values from each of the plurality of sensors; in response to detecting a change in at least one value as an out of bound value, analyzing the information including values by comparing the values to a predetermined model to determine whether a pattern of values matches a baseline set of values for the device; in response to a determination the pattern of values does not match the baseline set of values for the device, executing a predetermined set of actions including disabling the device and sending an alert; in response to a determination the pattern of values does match the baseline set of values for the device, instructing the device to verify the information by: reporting in use in response to the device being in use by a user, waiting a preconfigured time before reporting no user interaction, and initiating a process of disabling the device in response to expiration of the preconfigured time; in response to the device reporting a transaction in process, initiating a timer used to indicate an out of bound usage of the device; in response to the user completing the transaction, receiving a report from the device indicating completion of the transaction; in response to receiving the report from the device indicating completion of the transaction by the user within a predetermined time, restarting a normal monitoring cycle; and in response to receiving the report from the device indicating completion of the transaction by the user exceeds the predetermined time, disabling the device.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    monitoring, by a computing device, outputs of sensors associated with a machine that receives magnetic stripe cards, wherein the computing device is configured to determine normal usage of the machine and abnormal usage of the machine based on the outputs of the sensors;
    in response to the monitoring, detecting, by the computing device, the outputs of the sensors indicate an event;
    in response to the detecting the outputs of the sensors indicate an event, determining, by the computing device, the outputs of the sensors indicate one of normal usage of the machine and abnormal usage of the machine, wherein the computing device determines the outputs of the sensors indicate abnormal usage of the machine based on the outputs of the sensors exceeding respective threshold values simultaneously and continuously for a predefined threshold time;
    in response to determining the outputs of the sensors indicate abnormal usage of the machine, initiating, by the computing device, a security action;
    in response to determining the outputs of the sensors indicate normal usage of the machine, determining, by the computing device, the machine is in use or not in use;
    in response to determining the machine is not in use, initiating, by the computing device, the security action;
    in response to determining the machine is in use, determining, by the computing device, whether the use ends within a predefined monitor time;
    in response to determining the use does not end within the predefined monitor time, initiating, by the computing device, the security action; and
    in response to determining the use does end within the predefined monitor time, returning to the monitoring the outputs of the sensors;
    wherein the sensors comprise:
        a first proximity sensor using first proximity sensing technology and a second proximity sensor using second proximity technology that is different than the first proximity sensing technology, the first proximity sensor and the second proximity sensor being embedded in or integrated with a card insertion portion of the machine; and
        a light detection sensor and a motion detection sensor both embedded in or integrated with the machine and pointing outward toward an area in front of the machine; and
    the security action comprises disabling the machine.

2. The method of claim 1, wherein the security action is additionally comprises one or more selected from a group consisting of:
    sending an alert message to a user device;
    causing the machine to emit an alert that is audio and/or visual; and
    activating a camera that is external to and pointed at the machine.

3. The method of claim 1, further comprising:
    detecting motion in front of the machine using the motion detection sensor; and
    in response to the detecting motion, temporarily suspending the monitoring for a predefined buffer time.

4. The method of claim 1, wherein the determining whether the use ends within a predefined monitor time comprises starting a timer and comparing a value of the timer to the predefined monitor time.

5. A computer program product comprising one or more computer readable storage media having program instructions collectively stored on the one or more computer readable storage media, the program instructions executable by one or more processors to:
    monitor outputs of sensors in a machine that receives magnetic stripe cards, wherein the program instructions are executable to determine normal usage of the machine and abnormal usage of the machine based on the outputs of the sensors;

determine the outputs of sensors indicate one of normal usage of the machine and abnormal usage of the machine based on the outputs of the sensors exceeding respective threshold values simultaneously and continuously for a predefined threshold time;

in response to determining the outputs of the sensors indicate abnormal usage of the machine, initiate a security action;

in response to determining the outputs of the sensors indicate normal usage of the machine, determine the machine is in use or not in use;

in response to determining the machine is not in use, initiate the security action;

in response to determining the machine is in use, determine whether the use ends within a predefined monitor time;

in response to determining the use does not end within the predefined monitor time, initiate the security action; and in response to determining the use does end within the predefined monitor time, return to monitoring the outputs of the sensors;

wherein the sensors comprise:
a first proximity sensor using first proximity sensing technology and a second proximity sensor using second proximity technology that is different than the first proximity sensing technology, the first proximity sensor and the second proximity sensor being embedded in or integrated with a card insertion portion of the machine; and a light detection sensor and a motion detection sensor both embedded in or integrated with the machine and pointing outward toward an area in front of the machine; and the security action comprises disabling the machine.

6. The computer program product of claim 5, wherein the security action additionally comprises one or more selected from a group consisting of:
sending an alert message to a user device;
causing the machine to emit an alert that is audio and/or visual; and
activating a camera that is external to and pointed at the machine.

7. The computer program product of claim 5, wherein the determining the outputs of the sensors indicate normal usage of the machine and abnormal usage of the machine comprises analyzing the outputs of the sensors using a trained analytics model.

8. The computer program product of claim 5, wherein the determining the outputs of the sensors indicate normal usage of the machine and abnormal usage of the machine comprises comparing the outputs of the sensors to respective threshold values.

9. The computer program product of claim 5, further comprising:
detecting motion in front of the machine using the motion detection sensor; and
in response to the detecting motion, temporarily suspending the monitoring for a predefined buffer time.

10. The computer program product of claim 5, wherein determining the outputs of the sensors indicate normal usage of the machine and abnormal usage of the machine comprises inputting time series data of the sensors to an analytics model that outputs a determination of normal usage of the machine or abnormal usage of the machine.

11. The computer program product of claim 10, wherein the analytics model is trained using training sets of time series data, wherein each of the training sets of time series data is labeled as either positive to indicate normal usage or negative to indicate abnormal usage.

12. A system comprising:
a processor, a computer readable memory, one or more computer readable storage media, and program instructions collectively stored on the one or more computer readable storage media, the program instructions executable to:

monitor outputs of sensors in a machine that receives magnetic stripe cards, wherein the program instructions are executable to determine normal usage of the machine and abnormal usage of the machine based on the outputs of the sensors;

determine the outputs of sensors indicate one of normal usage of the machine and abnormal usage of the machine by inputting time series data of the sensors to a trained analytics model that outputs a determination of normal usage of the machine or abnormal usage of the machine;

in response to determining the outputs of the sensors indicate abnormal usage of the machine, initiate a security action;

in response to determining the outputs of the sensors indicate normal usage of the machine, determine the machine is in use or not in use;

in response to determining the machine is not in use, initiate the security action;

in response to determining the machine is in use, determine whether the use ends within a predefined monitor time;

in response to determining the use does not end within the predefined monitor time, initiate the security action; and in response to determining the use does end within the predefined monitor time, return to monitoring the outputs of the sensors;

wherein the sensors comprise:
a first proximity sensor using first proximity sensing technology and a second proximity sensor using second proximity technology that is different than the first proximity sensing technology, the first proximity sensor and the second proximity sensor being embedded in or integrated with a card insertion portion of the machine; and a light detection sensor and a motion detection sensor both embedded in or integrated with the machine and pointing outward toward an area in front of the machine; and the security action comprises disabling the machine.

13. The system of claim 12, wherein the security action additionally comprises one or more selected from a group consisting of:
sending an alert message to a user device;
causing the machine to emit an alert that is audio and/or visual; and
activating a camera that is external to and pointed at the machine.

14. The system of claim 12, further comprising:
detecting motion in front of the machine using the motion detection sensor; and in response to the detecting motion, temporarily suspending the monitoring for a predefined buffer time.

\* \* \* \* \*